(12) United States Patent
Albright et al.

(10) Patent No.: US 7,972,038 B2
(45) Date of Patent: Jul. 5, 2011

(54) DIRECT VIEW LED LAMP WITH SNAP FIT HOUSING

(75) Inventors: Kim M. Albright, Warner, NH (US); Thomas Tessnow, Weare, NH (US)

(73) Assignee: OSRAM SYLVANIA Inc., Danvers, MA (US)

( * ) Notice: Subject to any disclaimer, the term of this patent is extended or adjusted under 35 U.S.C. 154(b) by 408 days.

(21) Appl. No.: 12/011,125

(22) Filed: Jan. 24, 2008

(65) Prior Publication Data

US 2009/0034283 A1  Feb. 5, 2009

Related U.S. Application Data

(60) Provisional application No. 60/962,787, filed on Aug. 1, 2007.

(51) Int. Cl.
 *F21V 3/00* (2006.01)
 *F21V 29/00* (2006.01)
(52) U.S. Cl. .............. 362/311.02; 362/249.02; 362/294
(58) Field of Classification Search .................. None
 See application file for complete search history.

(56) References Cited

U.S. PATENT DOCUMENTS

| 5,632,551 A | 5/1997 | Rigsby | |
|---|---|---|---|
| 7,214,952 B2 * | 5/2007 | Klipstein et al. | 250/504 H |
| 7,217,022 B2 * | 5/2007 | Ruffin | 362/554 |
| 7,553,044 B2 * | 6/2009 | Wedell | 362/247 |
| 2007/0070645 A1 * | 3/2007 | Coushaine et al. | 362/555 |
| 2008/0130308 A1 | 6/2008 | Behr et al. | |

FOREIGN PATENT DOCUMENTS

| EP | 1691130 A1 | 8/2006 |
|---|---|---|
| EP | 1767967 A2 | 3/2007 |
| WO | 03/006877 A2 | 1/2003 |
| WO | WO 2006066531 A1 | 6/2006 |

OTHER PUBLICATIONS

European Search Report and Annex on European Patent Application No. 08 02 3588.2, mailed on Oct. 27, 2008.

* cited by examiner

*Primary Examiner* — Jason Moon Han
*Assistant Examiner* — Sean P Gramling
(74) *Attorney, Agent, or Firm* — Edward S. Podszus

(57) ABSTRACT

A direct view LED lamp (10) comprising: a heat sink body (12) having a longitudinal axis (14) and a wall (16) having an exterior (18) and an interior (20). A cavity (22) is formed in the interior (20) and is defined by a circumferential side wall (24) and a back wall (26). A circuit board (28) is positioned in the cavity (22) adjacent the back wall (26). At least one LED (30) is mounted on the circuit board (28) facing in an axial direction parallel to the longitudinal axis (14) and away from the circuit board (28). An optical light guide (32) is positioned adjacent the at least one LED (30). A housing (42) spans the cavity (22) and has a coupling face (44) to mate with the heat sink body (12).

11 Claims, 3 Drawing Sheets

US 7,972,038 B2

DIRECT VIEW LED LAMP WITH SNAP FIT HOUSING

CROSS REFERENCE TO RELATED APPLICATION

This application claims priority from Provisional Application Ser. No. 60/962,787 filed Aug. 1, 2007 for Direct View LED Lamp with Snap Fit Housing.

TECHNICAL FIELD

This invention relates to lamps and more particularly to lamps using light emitting diodes (LED or LEDs) as a light source. Still more particularly it relates to such lamps providing a direct view as opposed to a reflected view and to such lamps that are easy to assemble. U.S. pending patent application Ser. No. 11/477,731, filed Jun. 29, 2006 and assigned to the assignee of the present invention, discloses a prior art lamp requiring different mounting techniques for the light guide.

BACKGROUND ART

The efficiency of LEDs has caused a rapid increase in their use in the automotive industry, particularly as center high mount stop lights (CHMSLs) and tail lights generally. Most of the previous devices, while providing a light output sufficient for their designed purpose, have been expensive to manufacture, requiring many parts and complicated assembly.

DISCLOSURE OF INVENTION

It is, therefore, an object of the invention to obviate the disadvantages of the prior art.

It is another object of the invention to enhance LED light sources.

Yet another object of the invention is the improvement of LED light sources.

These objects are accomplished, in one aspect of the invention, by a direct view LED lamp comprising a heat sink body having a longitudinal axis and a wall having an exterior and an interior. A cavity is formed in the interior and is defined by a circumferential sidewall and a back wall. A circuit board is positioned in the cavity adjacent the back wall. At least one LED is mounted on the circuit board facing in an axial direction parallel to the longitudinal axis and away from the circuit board. An optical light guide is positioned adjacent the at least one LED, the optical light guide having a guide portion having an internally reflective surface and at least one optical input window. The guide portion extends axially away from the optical input window to an optical output window in a direction parallel to the longitudinal axis. A housing spans at least the cavity, and has a coupling face to mate with the heat sink body. At least one first closure feature is associated with the housing to latch the housing in a fixed relation to the heat sink body, and the heat sink body has a second closure feature that cooperates with the first closure feature. The housing has an optical passage permitting the passage of light from the output window to the lamp exterior. Various pressure means are included within the assembly to achieve good contact where necessary.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
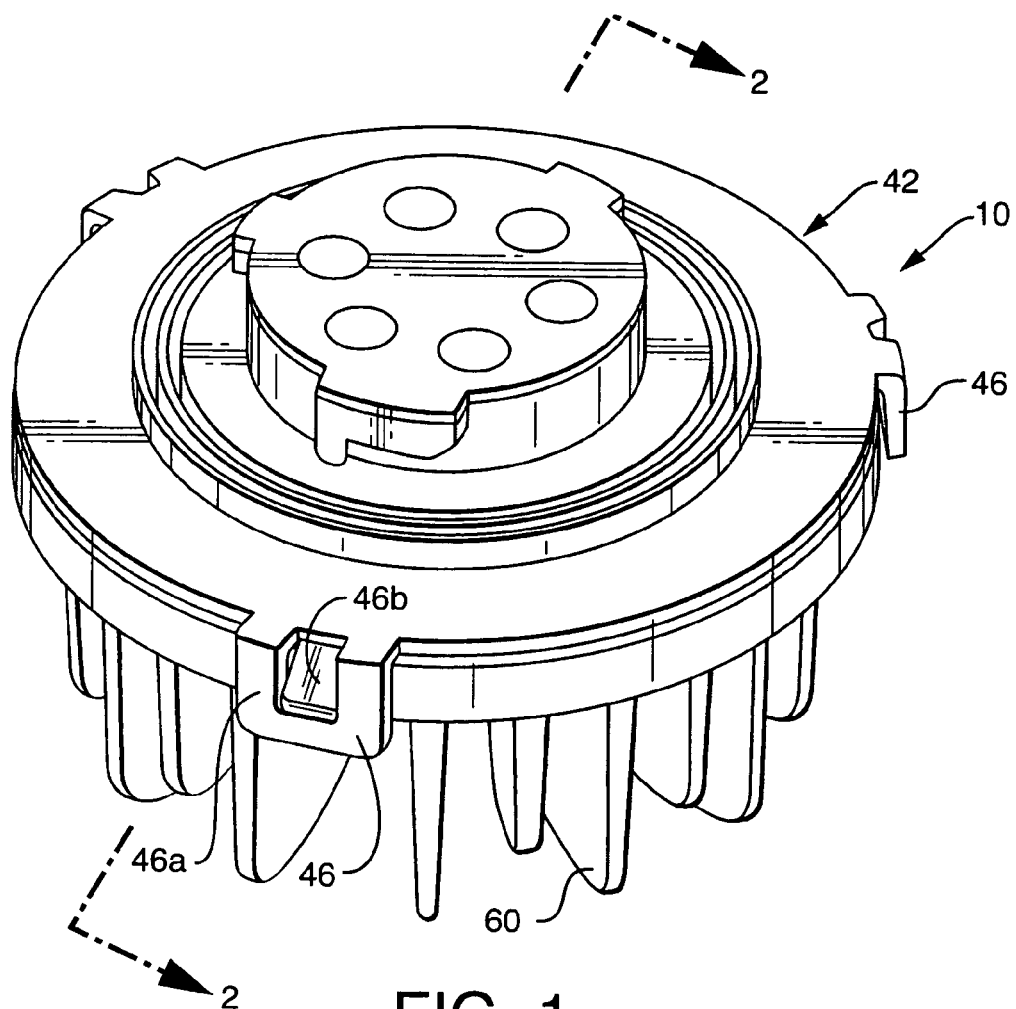
FIG. 1 is a perspective view of an embodiment of the invention.
Figure 2:
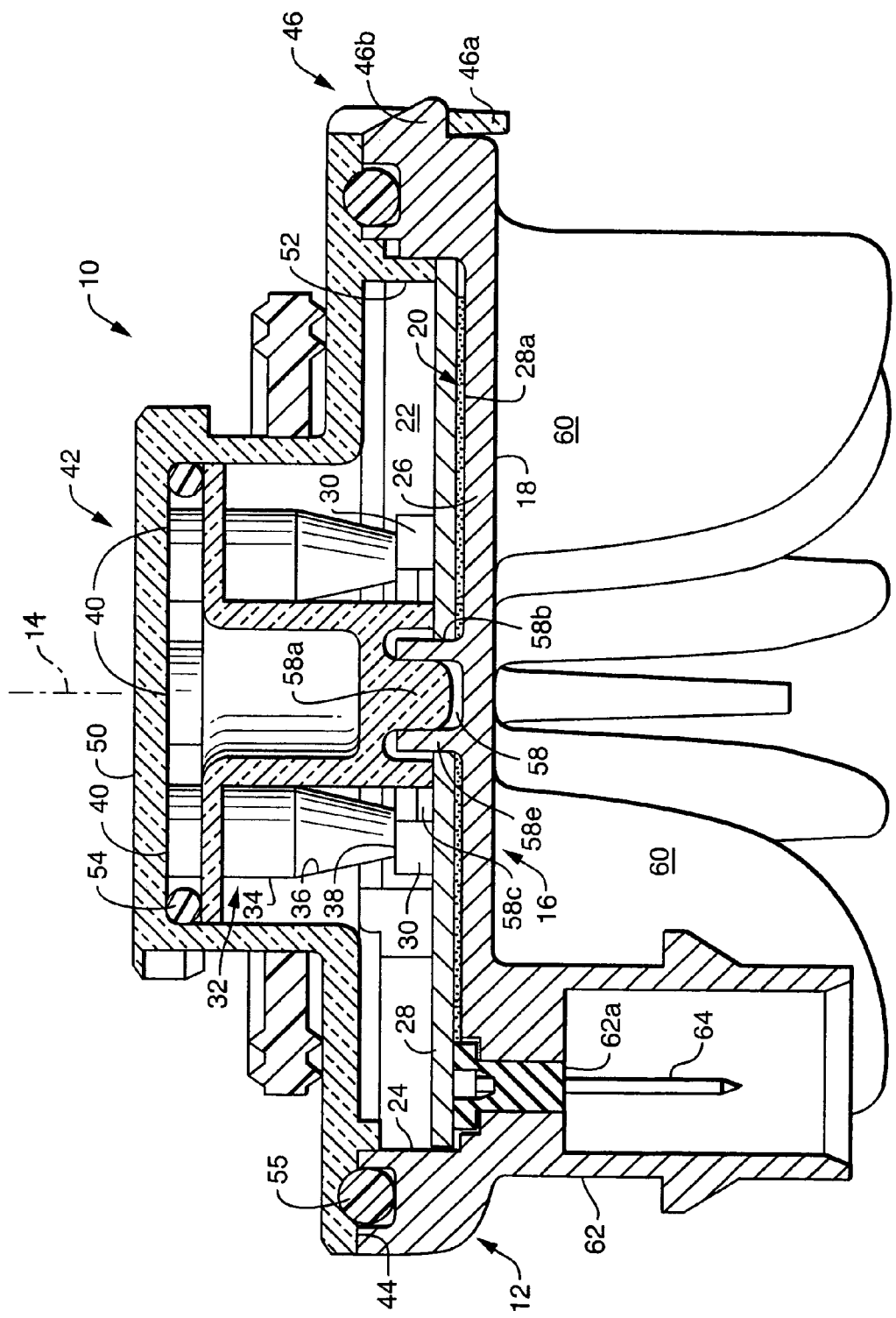
FIG. 2 is a sectional view taken along the line 2-2 of FIG. 1.

Referring now to the drawings with greater particularity, there is shown in FIGS. 1 and 2 a direct view LED lamp 10 having a heat sink body 12 with a longitudinal axis 14 and a transverse wall 16 having an exterior side 18 and an interior side 20. The heat sink body 12 is formed of suitable material, for example, aluminum, zinc, cupper or a thermally conductive plastic.

A cavity 22 is formed by the interior side 20 and is defined by a circumferential sidewall 24 and a back wall 26. The heat sink body 12 roughly defines a cylindrically shape and includes a plurality of heat conductive fins 60. The heat sink body 12 includes a socket receptacle 62 containing electrical connections 64. The electrical connections 64 extend from the socket receptacle 62 to a circuit board 28 positioned in the cavity 22 adjacent the back wall 26. Preferably, the contacts 64 are carried by a grommet 62a of, for example, rubber.

At least one LED 30 (preferably, 6) is mounted on the circuit board 28 facing in a direction parallel to the longitudinal axis 14 and axially away from the circuit board 28. A thermal gasket 28a is positioned between the printed circuit board 28 and the back wall 26 to provide thermal conductivity for those times when the LEDs are operating.

Figure 4:
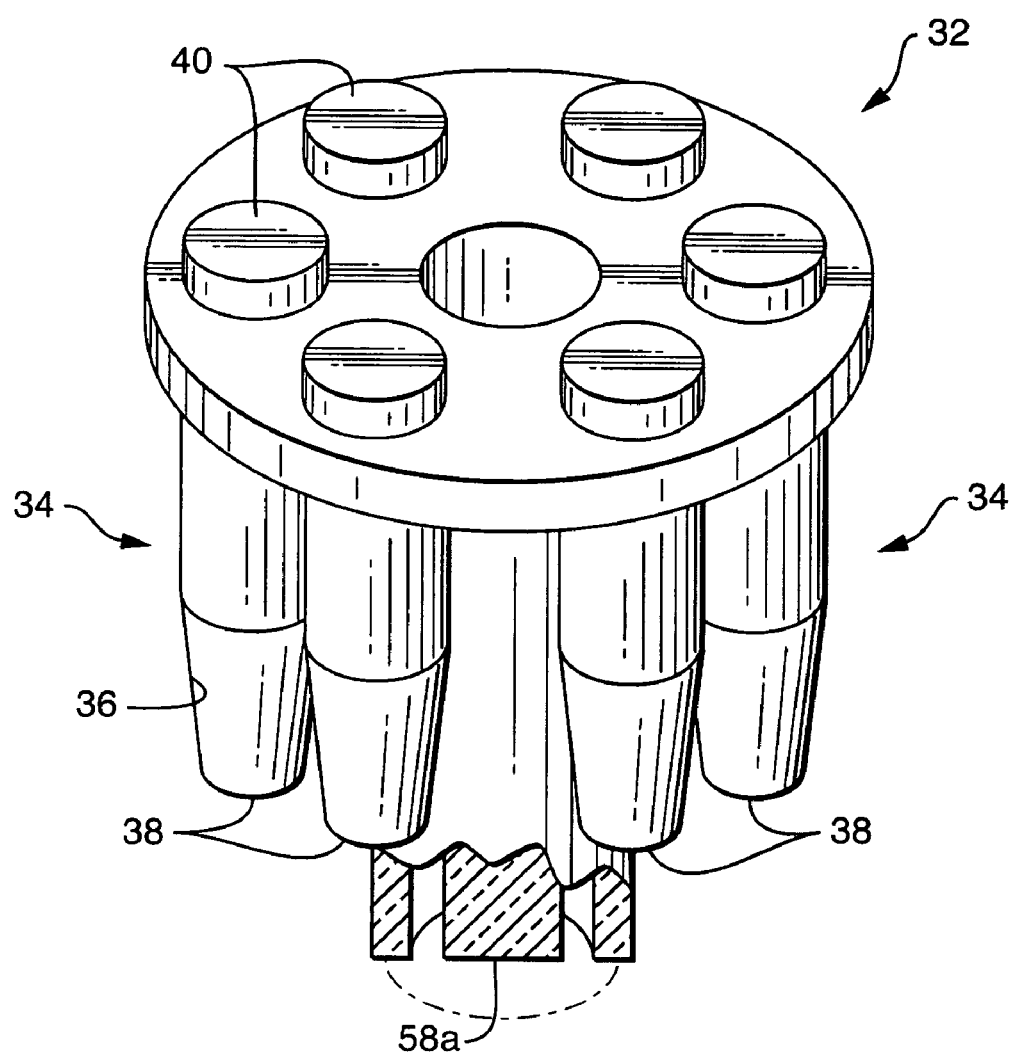
FIG. 4 is a perspective view of an optical light guide according to an aspect of the invention.

An optical light guide 32 (shown most clearly in FIGS. 2 and 4) is provided for carrying the light emitted by the LEDs outwardly to an area to be illuminated. The light guide 32 has a plurality of arms (equal in number to the number of LEDs) each having an optical input window 38 adjacent the LED or LEDs 30 and a guide portion 34 having an internally reflective surface 36. The guide portion 34 extends axially away from the optical input window 38 to an optical output window 40.

Figure 3:
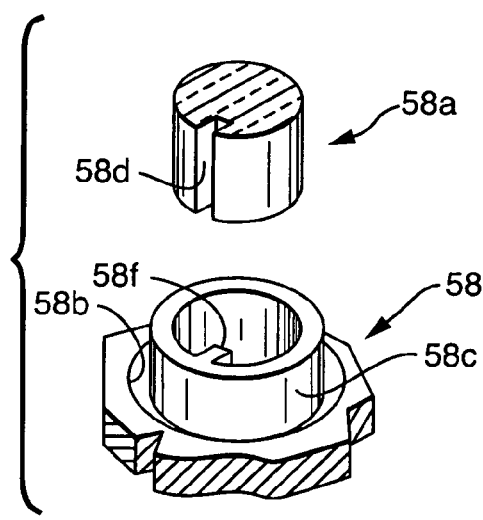
FIG. 3 is a partial, perspective view of an alignment means.

The circuit board 28 additionally includes an alignment registration 58, and the optical light guide 32 includes an alignment fitting 58a mated in registration to the alignment registration 58. The alignment registration 58 includes an opening 58b in the circuit board 28, and the alignment fitting 58a can be a clip 58c, the clip 58c being sized and shaped to fit the opening 58b, as shown in FIG. 2. Alternatively, the alignment registration can comprise a key 58f formed in the hollow boss 58e and a matching keyway 58d formed in the alignment fitting 58a, as shown in FIG. 3.

A housing 42 spans the cavity 22 and has a coupling face 44 to mate with the heat sink body 12. At least a first closure feature 46 is provided to latch the housing 42 in a fixed relation to the heat sink body 12. The closing feature 46 as shown includes a tensioned female contact 46a latched in tension with a male contact 46b on the exterior of the heat sink body 12. The housing 42 is preferably constructed from a suitable plastic material, and, as shown in FIG. 1, includes 3 closing features, 120° apart.

The housing 42 further has an optical passage 50 that permits the passage of light from the output window 40 to the lamp exterior. The housing 42 also includes at least one pressure foot 52 to pin the circuit board 28 in close thermal contact with the back wall 26, via the thermal gasket 28*a*.

A compression gasket 55 is fitted intermediate the housing 42 and the heat sink body 12 to seal the cavity 22; and a second compressible pressure element 54 is positioned intermediate the housing 42 and the light guide 32 to pin the optical light guide 32 in close optical connection to the at least one LED 30.

Thus, there is provided a direct view LED lamp that assembles easily and quickly and yet maintains good registration of all of its parts.

While there have been shown and described what are at present considered to be the preferred embodiments of the invention, it will be apparent to those skilled in the art that various changes and modifications can be made herein without departing from the scope of the invention as defined by the appended claims.

What is claimed is:

1. A direct view LED lamp comprising:
    a heat sink body having a longitudinal axis and a wall having an exterior side and an interior side;
    a cavity formed by said interior side and defined by a circumferential side wall and a back wall;
    a circuit board positioned in said cavity adjacent said back wall;
    at least one LED mounted on said circuit board facing in an axial direction parallel to said longitudinal axis and away from said circuit board;
    an optical light guide adjacent said at least one LED, said optical light guide having a guide portion having an internally reflective surface and at least one optical input window, the guide portion extending axially away from the optical input window to an optical output window in a direction parallel to said longitudinal axis;
    wherein said circuit board includes a boss having a key projecting therefrom, and said optical light guide includes a keyway sized and shaped to receive said key for aligning said optical light guide with said at least one LED;
    a housing at least spanning the cavity, and having a coupling face to mate with said heat sink body; and
    at least one first closure feature associated with said housing to latch said housing in a fixed relation to said heat sink body, the heat sink body having a second closure feature to cooperate with said first closure feature, said housing having an optical passage permitting the passage of light from said output window to the lamp exterior.

2. The direct view LED lamp of claim 1 wherein said housing includes at least one pressure foot to pin said circuit board in close thermal contact with said back wall.

3. The direct view LED lamp of claim 1 wherein said housing includes a compressible pressure element to pin said optical light guide in close optical connection to said at least one LED.

4. The direct view LED lamp of claim 1 including a gasket intermediate said housing and said heat sink body that seals said cavity.

5. The direct view LED lamp of claim 1, wherein said closing feature includes a tensioned female portion on said housing and a male portion formed on an said exterior of said heat sink body.

6. The direct view LED lamp of claim 1, wherein said heat sink body roughly defines a cylindrically shaped body including a plurality of heat conductive fins exposed to exterior air.

7. The direct view LED lamp of claim 1, wherein said heat sink body includes a socket receptacle containing electrical connections, and said electrical connections extend from said socket receptacle to said circuit board.

8. The direct view LED lamp of claim 1 wherein the first closure feature (46) comprises a tensioned female contact (46*a*) and the second closure feature (48) comprises at least one male contact feature (46*b*) having a projection extending from said heat sink body (12).

9. The direct view LED lamp of claim 8 wherein the at least one male contact feature (46*b*) extends laterally transverse to the longitudinal axis (14) and the tensioned female contact (46*a*) extends parallel to the longitudinal axis (14).

10. The direct view LED lamp of claim 1, wherein said internally reflective surface is disposed between said optical input window and optical said output window.

11. A direct view LED lamp comprising:
    a heat sink body having a longitudinal axis and a wall having an exterior and an interior;
    a cavity formed in said interior defined by a circumferential side wall and a back wall; said heat sink body roughly defining a cylindrically shape including a plurality of heat conductive fins; said heat sink body including a socket receptacle containing electrical connections, said electrical connection extending from said socket receptacle to a circuit board positioned in said cavity adjacent said back wall;
    at least one LED mounted on said circuit board facing in a direction parallel to said longitudinal axis and axially away from said circuit board;
    an optical light guide having at least one optical input window adjacent said at least one LED and including a guide portion having an internally reflective surface, said guide portion extending axially away from said optical input window to an optical output window; said circuit board including an alignment registration, and said optical light guide including an alignment fitting mated in registration to said alignment registration; the alignment registration being an opening in said circuit board, and the alignment fitting being a clip, said clip being sized and shaped to fit said opening;
    a housing at least spanning the cavity and having a coupling face to mate with said heat sink body, and at least a first closure feature to latch the housing in a fixed relation to the heat sink body, said closing feature including a tensioned female contact latched in tension with a male contact on said exterior of said heat sink body, said housing further having an optical passage permitting the passage of light from the output window to the lamp exterior, and said housing including at least one pressure foot to pin said circuit board in close thermal contact with said back wall;
    a gasket intermediate said housing and said heat sink body sealing said cavity; and
    a compressible pressure element intermediate said housing and said light guide to pin said optical light guide in close optical connection to said at least one LED.

* * * * *